[20.]

JAMES H. OLIVER.

Improvement in Car Coupling.

No. 118,476. Patented Aug. 29, 1871.

UNITED STATES PATENT OFFICE.

JAMES H. OLIVER, OF BALTIMORE, MARYLAND.

IMPROVEMENT IN CAR-COUPLINGS.

Specification forming part of Letters Patent No. 118,476, dated August 29, 1871.

*To all whom it may concern:*

Be it known that I, JAMES H. OLIVER, of Baltimore, in the county of Baltimore and State of Maryland, have invented certain Improvements in Car-Couplings, of which the following is a specification:

My invention consists in improvements in the manner of constructing the link and pin securing the same to the draw-bar of the car. The link is so constructed as to raise the pin when it is desired to couple two cars together, and allow it to drop into its place and secure them firmly as soon as the link reaches its position. The pin is so constructed that the entrance of the link into the socket causes it to be lifted from its seat so as to allow the end of the link to pass under it.

Figure 1:
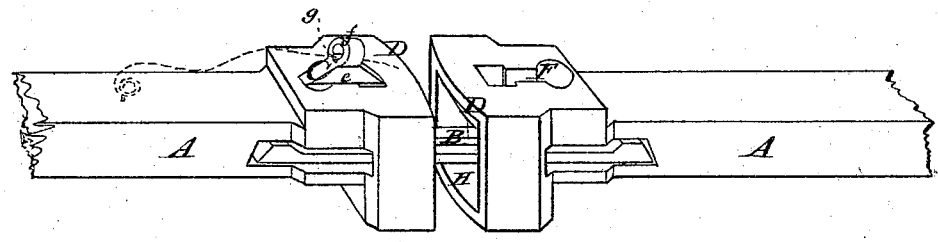
Figure 2:
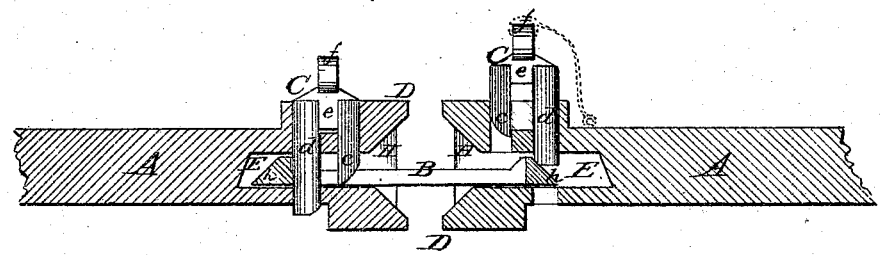
Figure 3:
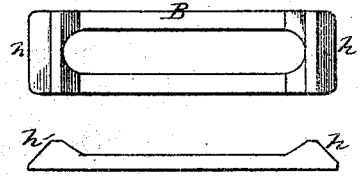
Figure 4:
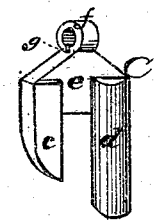

Figure 1 is a perspective view of my improved coupling. Fig. 2 is a longitudinal section thereof. Fig. 3 is a plan and side view of the link. Fig. 4 is a perspective view of the pin.

A is the draw-bar; B, the link; C, the pin; D, the head of the draw-bar; E, the link-socket; and F, the aperture to admit the pin. The pin C is provided with a lug, c, united with the bolt d of the pin by the cross-bar e, having a ring, f, by which it can be withdrawn or to which a cord or chain may be attached. At the junction of the ring f with the cross-bar e a groove, g, is provided, in which may rest a spring to force the pin back to its place in cases where the weight of the pin may not be sufficient for the purpose, or when the pin may be placed in a horizontal or other position so as not to be effectively acted upon by gravity. The link B has a beveled end, h, making an inclined plane over which the beveled extremity of the lug c slides as it rises. The link at each end is considerably thicker than in the middle, in order that when in contact with the lug c it will raise it sufficiently to permit the bolt d to be reached by the end of the link, as is hereinafter described. This construction also gives room for additional vertical play to the opposite end of the link, to provide for inequalities in the levels of the two draw-bars and the cars to which they belong.

The action of the coupler is as follows: When one of the draw-bars containing the link B approaches the throat H of the socket E, the inclination of the throat guides the end of the link until it strikes the beveled and slightly curved extremity of the lug c of the pin C, and the end of the link, having a corresponding bevel, slides under it, raising the pin, which moves readily in its socket F until the end of the link engages the lower end of the bolt d, the front edge of which is also slightly beveled, and lifts the pin far enough to allow the link to pass it, when it drops into its place and the coupling is complete. To prevent the pin C being forced out of its socket F by the sudden contact of the link a simple fastening of cord or chain may be used, as indicated in dotted lines in Fig. 2. The spring shown in dotted lines in Fig. 1 may also be applied as a guard for the same purpose.

I claim as my invention—

The pin C having projections c and d, adapted to the draw-head in the manner shown and described, and in combination with the link B provided with inclined heads h, all substantially as and for the purposes hereinbefore set forth.

JAS. H. OLIVER.

Witnesses:
 JOS. T. K. PLANT,
 W. A. BOSS.